(12) United States Patent (10) Patent No.: US 8,988,613 B2
Endo (45) Date of Patent: Mar. 24, 2015

(54) IMAGE TRANSMISSION DEVICE, IMAGE TRANSMISSION METHOD, AND COMPUTER-READABLE DEVICE

(71) Applicant: Olympus Corporation, Tokyo (JP)

(72) Inventor: Takahisa Endo, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/266,400

(22) Filed: Apr. 30, 2014

(65) Prior Publication Data

US 2014/0232936 A1  Aug. 21, 2014

Related U.S. Application Data

(63) Continuation of application No. PCT/JP2012/079002, filed on Nov. 8, 2012.

(30) Foreign Application Priority Data

Nov. 8, 2011  (JP) ................................. 2011-244352

(51) Int. Cl.
*H04N 5/38* (2006.01)
*H04N 7/01* (2006.01)
*G09G 5/00* (2006.01)
*H04N 21/4363* (2011.01)
(Continued)

(52) U.S. Cl.
CPC .. *H04N 7/01* (2013.01); *G09G 5/00* (2013.01); *H04N 21/43637* (2013.01); *H04N 21/43615* (2013.01); *H04N 21/4402* (2013.01); *G09G 2340/0407* (2013.01); *G09G 2370/042* (2013.01); *G09G 2370/16* (2013.01)
USPC ............................ 348/723; 348/705; 348/474

(58) Field of Classification Search
USPC .......... 348/441, 552, 706, 723, 473, 474, 724
See application file for complete search history.

(56) References Cited

U.S. PATENT DOCUMENTS

2003/0103570 A1    6/2003  Du Val
2009/0322948 A1*  12/2009  Funabiki et al. ............... 348/571
2010/0289871 A1*  11/2010  Tatsuta et al. ................... 348/42
(Continued)

FOREIGN PATENT DOCUMENTS

JP   2007-108198 A   4/2007
JP   2008-035517 A   2/2008
(Continued)

OTHER PUBLICATIONS

International Search Report, dated Dec. 11, 2012, issued in corresponding application No. PCT/JP2012/079002.
(Continued)

*Primary Examiner* — Michael Lee
(74) *Attorney, Agent, or Firm* — Westerman, Hattori, Daniels & Adrian, LLP

(57) ABSTRACT

When the wireless communication connection with the display device is established and the ROM stores the display device identifier for uniquely identifying the display device and the setting information so as to be associated with each other, a control unit causes the format of the image to change by the video signal processing unit based on the setting information stored in the ROM and causes the image whose format is changed to be wirelessly transmitted to the wireless communication circuit unit, without performing request for transmission of the setting information to the display device.

6 Claims, 8 Drawing Sheets

(51) Int. Cl.
*H04N 21/436* (2011.01)
*H04N 21/4402* (2011.01)

(56) References Cited

U.S. PATENT DOCUMENTS

| | | | |
|---|---|---|---|
| 2011/0019623 A1* | 1/2011 | Funabiki et al. | 370/328 |
| 2011/0072473 A1* | 3/2011 | Funabiki et al. | 725/81 |
| 2012/0047538 A1* | 2/2012 | Murase et al. | 725/81 |

FOREIGN PATENT DOCUMENTS

| | | |
|---|---|---|
| JP | 2009-049787 A | 3/2009 |
| JP | 2009-182912 A | 8/2009 |
| JP | 2010-098378 A | 4/2010 |
| JP | 2011-015245 A | 1/2011 |
| WO | 2011/040007 A1 | 4/2011 |

OTHER PUBLICATIONS

Lochan V et al., "Wireless display: An unmet need in CE Ecosystem", Ubiquitous and Future Networks (ICUFN), Jun. 15, 2011, pp. 393-394, Third International Conference on, IEEE; cited in Extended European Search Report dated Dec. 18, 2014 (2 pages).

Bo Shen et al., "A very fast video spatial resolution reduction transcoder", 2002 IEEE International Conference on Acoustics, Speech and Signal Processing. Proceedings (ICASSP), May 13, 2002, pp. II-1989, IEEE, US; cited in Extended European Search Report dated Dec. 18, 2014 (4 pages).

Extended European Search Report dated Dec. 18, 2014, issued in corresponding EP Application No. 12847058.0 (5 pages).

* cited by examiner

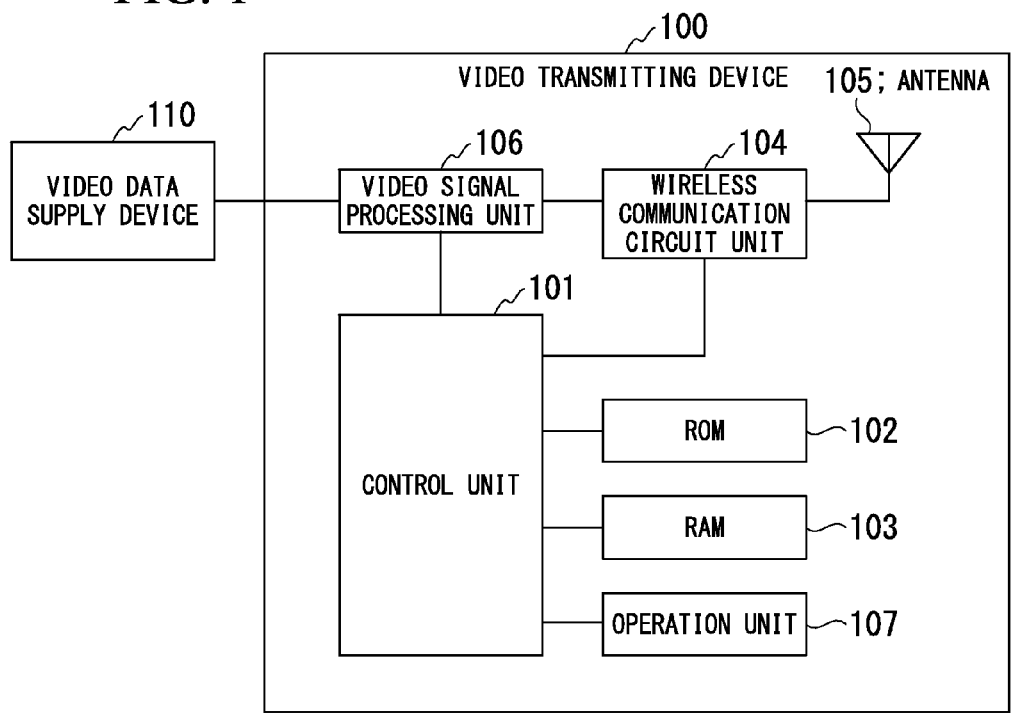
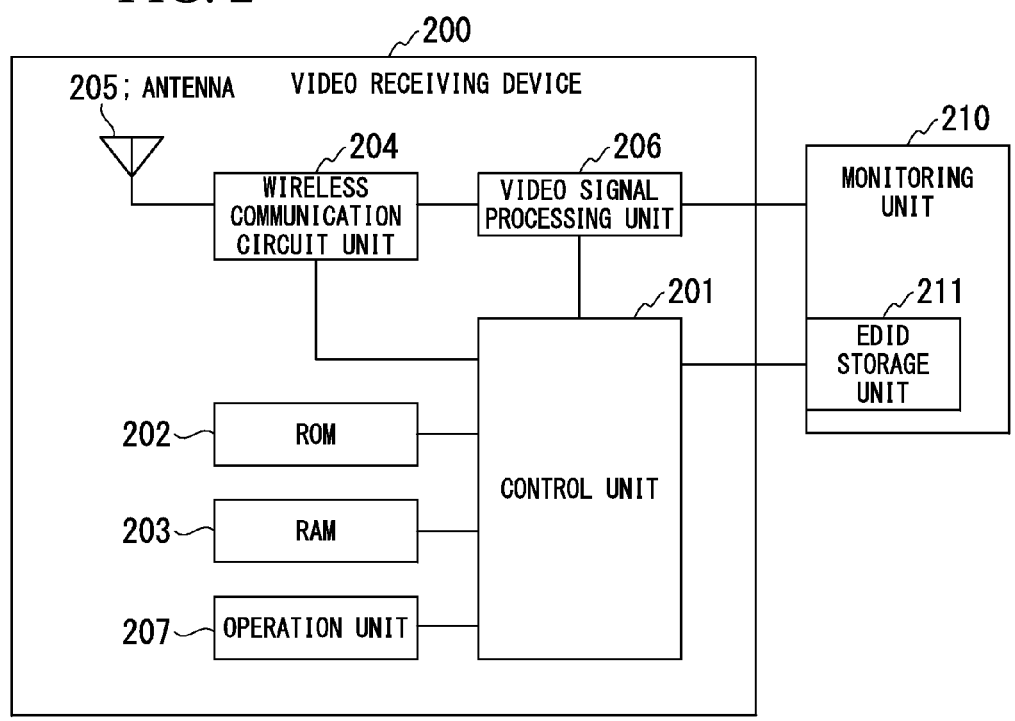

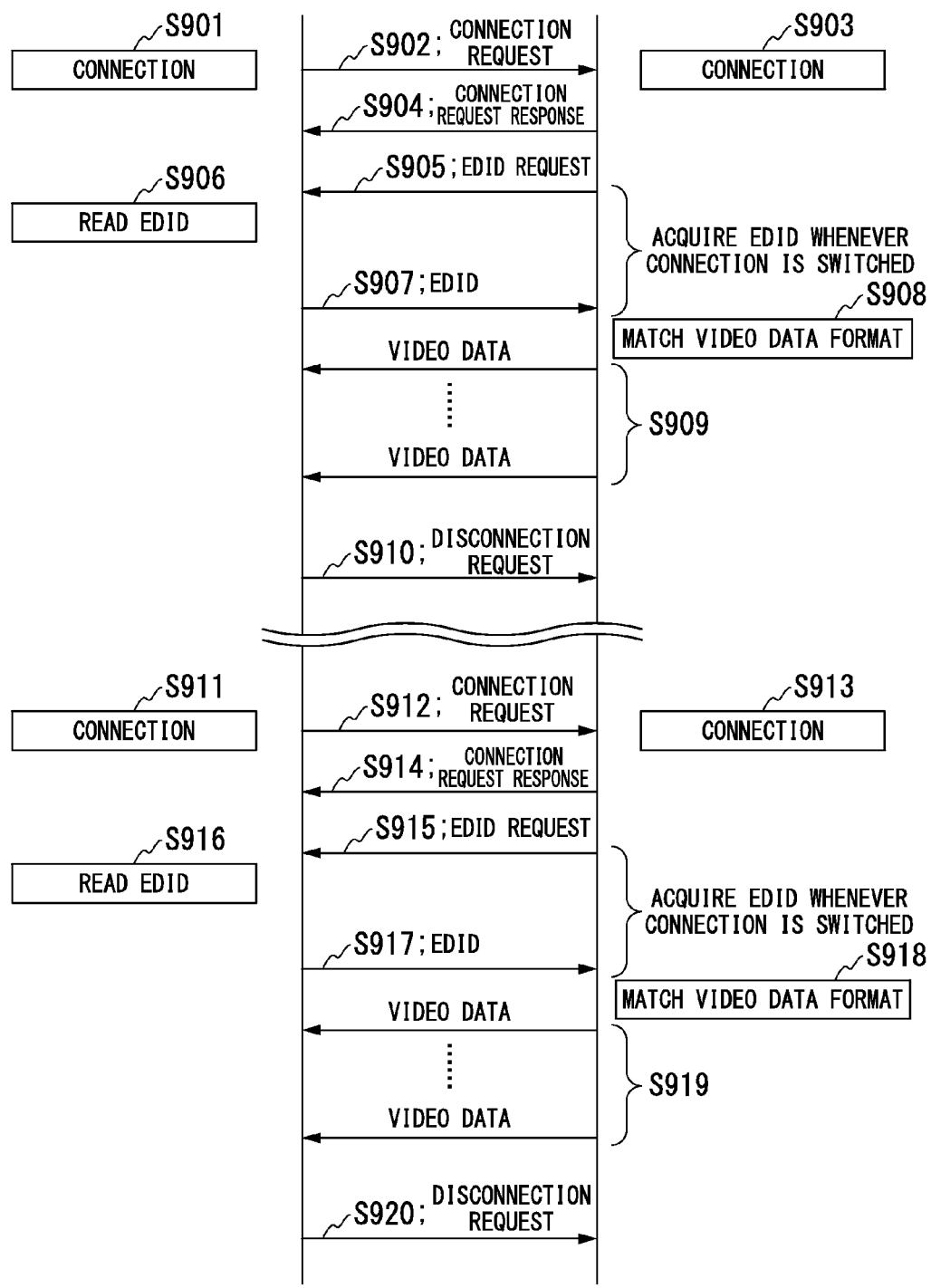

IMAGE TRANSMISSION DEVICE, IMAGE TRANSMISSION METHOD, AND COMPUTER-READABLE DEVICE

This application is a continuation application based on PCT/JP2012/079002, filed on Nov. 8, 2012, claiming priority based on Japanese Patent Application No. 2011-244352, filed in Japan on Nov. 8, 2011. The contents of both the Japanese Patent Application and the PCT Application are incorporated herein by reference.

TECHNICAL FIELD

The present invention relates to an image transmission device, an image transmission method, and a computer-readable device.

As a method of selecting one of videos transmitted from a plurality of video transmitting devices and displaying the video on a video receiving device, a method has been known in which a video signal switching device (switcher) is provided between the video receiving device and the video transmitting device, and the video signal switcher is controlled to select the video to be displayed on the video receiving device. In this method, the video receiving device and the video signal switcher are connected to each other by a cable and the video transmitting device and the video signal switcher are connected to each other by a cable. Therefore, when the number of video receiving devices and video transmitting devices which are used increases, the wiring of the cables and the structure of the video signal switcher become complicated. In addition, it is difficult to rapidly change the layout of the video receiving device and the video transmitting device.

In recent years, a wireless transmission technique has been improved and it is possible to wirelessly transmit a high-definition video from the video transmitting device to the video receiving device. Therefore, a method can be used in which the video receiving device and the video transmitting device are not connected to each other by a cable, but are connected to each other by wireless communication and the wireless connection is switched to select the video displayed on the video receiving device.

A high-definition multimedia interface (HDMI) has been known as a high-definition video transmission interface. When transmitting video data, a video transmitting device using the HDMI can read extended display identification data (EDID) indicating the capability/specifications of the video receiving device and transmit video and audio signals with a format suitable for the capability or specifications of the video receiving device.

In the video system in which the wireless connection between the video receiving device and the video transmitting device is switched to select the video to be displayed on the video receiving device, the video transmitting device needs to transmit the video and audio signals with the format suitable for the capability or specifications of the video receiving device. The video receiving device reads the EDID from a monitor which is connected thereto by the HDMI and transmits the read EDID to the video transmitting device using a predetermined protocol. The video transmitting device converts the format of the video data to be transmitted to a format which can be displayed by the video receiving device on the basis of the received EDID and starts to transmit the video data with the changed format.

FIG. 9 is a sequence diagram illustrating the flow of data between the video receiving device and the video transmitting device according to the related art.

(Step S901) The video receiving device starts a connection process.

(Step S902) The video receiving device which has started the connection process transmits a connection request message to the video transmitting device.

(Step S903) the video transmitting device which has received the connection request message starts a connection process.

(Step S904) The video transmitting device which has started the connection process transmits a connection request response message to the video receiving device.

(Step S905) The video transmitting device transmits an EDID request message to the video receiving device.

(Step S906) The video receiving device which has received the EDID request message reads the EDID from the monitor connected thereto.

(Step S907) The video receiving device transmits the read EDID to the video transmitting device.

(Step S908) The video transmitting device converts the format of video data on the basis of the received EDID.

(Step S909) The video transmitting device transmits the video data with the changed format to the video receiving device.

(Step S910) The video receiving device receives the video data and transmits a disconnection request message to the video transmitting device.

A process in Steps S911 to S920 is the same as that in Steps S901 to S910.

As such, the video receiving device and the video transmitting device transmit and receive the EDID when they are connected to each other. Even when the video receiving device and the video transmitting device are connected, disconnected, and then connected again (when the connection is switched), the video receiving device and the video transmitting device transmit and receive the EDID.

The EDID is stored in a serially-connected electrically erasable programmable read-only memory (EEPROM). Therefore, it takes time for the video receiving device to read the EDID. In addition, it takes time to transmit the EDID from the video receiving device to the video transmitting device. Therefore, there is a problem of taking a lot of time to switch the wireless connection between the video receiving device and the video transmitting device.

As a method of increasing the transmission speed of the EDID, a method has been known which stores in advance the EDID that is stored in a first storage unit (EEPROM) of the video receiving device (sink device) in a second storage unit that can read the EDID at a high speed; and reads the EDID from the second storage unit when the EDID is transmitted from the video receiving device to the video transmitting device, thereby increasing the transmission speed of the EDID (for example, see Japanese Unexamined Patent Application, First Publication No. 2008-35517).

SUMMARY OF THE INVENTION

According to a first aspect of the present invention, an image transmission device includes: a communication unit which wirelessly transmits a first image to a display device in time series for a period from a time when wireless communication connection with the display device including a display unit which displays the first image in time series is established to a time when the wireless communication connection is cut; an image change unit which changes a first format of the first image to be wirelessly transmitted to the display device based on setting information of the display unit of the display device which establishes the wireless communication connection; a storage unit that stores in association with a display device identifier for uniquely identifying the display device and the setting information of the display unit of the display device; and a control unit which causes the first format of the first image to change to a second format by the image change unit based on the setting information stored in the storage unit and causes the second image which is changed to the second format to be wirelessly transmitted to the communication unit, without performing request for transmission of the setting information to the display device, when the wireless communication connection with the display device is established and the storage unit stores in association with the display device identifier for uniquely identifying the display device and the setting information, the control unit performing the request for transmission of the setting information to the display device when the communication unit receives change notification information indicating that the setting information is changed from the display device.

According to a second aspect of the present invention, in the image transmission device according to the first aspect, the change notification information may include a connection request message transmitted from the display device.

According to a third aspect of the present invention, in the image transmission device according to the first aspect, the control unit may perform the request for transmission of the setting information to the display device when the storage unit is not stored in association with the display device identifier for uniquely identifying the display device and the setting information.

According to a fourth aspect of the present invention, in the image transmission device according to the third aspect, the control unit may perform the request for transmission of the setting information to the display device when the wireless communication connection with the display device is established and the storage unit is not stored in association with the display device identifier for uniquely identifying the display device and the setting information.

According to a fifth aspect of the present invention, an image transmission method includes: a communication step of allowing a communication unit to wirelessly transmit a first image to a display device in time series for a period from a time when wireless communication connection with the display device including a display unit which displays the first image in time series is established to a time when the wireless communication connection is cut; an image change step of allowing an image change unit to change a first format of the first image to be wirelessly transmitted to the display device based on setting information of the display unit of the display device which establishes the wireless communication connection; a storage step of allowing a storage unit to store in association with a display device identifier for uniquely identifying the display device and the setting information of the display unit of the display device; and a control step of allowing a control unit to cause the first format of the first image to change to a second format by the image change unit based on the setting information stored in the storage unit, to cause the second image which is changed to the second format to be wirelessly transmitted to the communication unit, without performing request for transmission of the setting information to the display device, when the wireless communication connection with the display device is established and the storage unit stores in association with the display device identifier for uniquely identifying the display device and the setting information, and to perform the request for transmission of the setting information to the display device when the communication unit receives change notification information indicating that the setting information is changed from the display device.

According to an sixth aspect of the present invention, there is provided a computer-readable device storing a program that causes a computer to function as: a communication unit which wirelessly transmits a first image to a display device in time series for a period from a time when wireless communication connection with the display device including a display unit which displays the first image in time series is established to a time when the wireless communication connection is cut; an image change unit which changes a first format of the first image to be wirelessly transmitted to the display device based on setting information of the display unit of the display device which establishes the wireless communication connection; a storage unit which stores in association with a display device identifier for uniquely identifying the display device and the setting information of the display unit of the display device; and a control unit which causes the first format of the first image to change to a second format by the image change unit based on the setting information stored in the storage unit and caused the second image which is changed to the second format to be wirelessly transmitted to the communication unit, without performing request for transmission of the setting information to the display device, when the wireless communication connection with the display device is established and the storage unit stores in association with the display device identifier for uniquely identifying the display device and the setting information, the control unit performing the request for transmission of the setting information to the display device when the communication unit receives change notification information indicating that the setting information is changed from the display device.

BRIEF DESCRIPTION OF DRAWINGS

FIG. 1 is a block diagram illustrating the structure of a video transmitting device according to a first embodiment of the present invention.

FIG. 2 is a block diagram illustrating the structure of a video receiving device according to the first embodiment of the present invention.

FIG. 9 is a sequence diagram illustrating the flow of data between a video receiving device and a video transmitting device according to the related art.

DESCRIPTION OF EMBODIMENTS

First Embodiment

Figure 3:
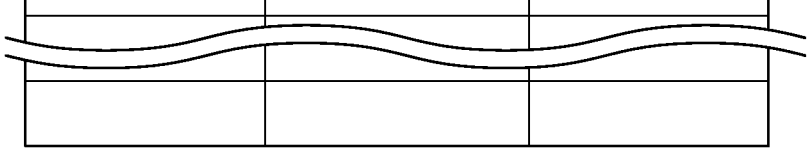
FIG. 3 is a schematic diagram illustrating the data structure of a connected device list in the first embodiment of the present invention.

Hereinafter, a first embodiment of the present invention will be described with reference to the drawings. First, the structure of a video transmitting device will be described. FIG. 1 is a block diagram illustrating the structure of the video transmitting device according to this embodiment. In the example shown in FIG. 1, a video transmitting device 100 includes a control unit 101, a read only memory (ROM) 102 (storage unit), a random access memory (RAM) 103, a wireless communication circuit unit 104 (communication unit), an antenna 105, a video signal processing unit 106 (image change unit), and an operation unit 107. In addition, as shown in FIG. 1, all units of the video transmitting device 100 are connected to each other.

In the example shown in FIG. 1, the video transmitting device 100 is connected to a video data supply device 110 which supplies video data. In the example shown in FIG. 1, the video data supply device 110 is different from the video transmitting device 100. However, the present invention is not limited thereto. For example, the video transmitting device 100 may include the video data supply device 110.

The control unit 101 operates according to a program stored in the ROM 102 and controls each unit of the video transmitting device 100. The ROM 102 is a rewritable non-volatile memory, such as a flash ROM, and stores various kinds of setting information, such as a program for operating the control unit 101, a connected device list, and communication setting parameters. The RAM 103 is a primary storage memory and is used as a work area which is used for the calculation operation of the control unit 101 or an area which temporarily stores various settings.

The wireless communication circuit unit 104 wirelessly communicates with other devices through the antenna 105. Specifically, the wireless communication circuit unit 104 includes, for example, a radio-frequency circuit unit which is required for wireless communication and a buffer memory which stores buffer data during wireless communication with an encoding/decoding circuit unit. The antenna 105 is connected to the wireless communication circuit unit 104. In this embodiment, the wireless communication circuit unit 104 performs wireless communication using a predetermined radio system, such as IEEE802.11.

The video signal processing unit 106 changes the format of video data input from the video data supply device 110 to a format which can be displayed by a monitoring unit 210 (which will be described below) connected to a video receiving device. In addition, the video signal processing unit 106 compresses the video data with the changed format using a predetermined method and outputs the compressed video data to the wireless communication circuit unit 104. The operation unit 107 includes a plurality of switches, such as a power switch, an operation switch, and a setting switch, converts the state of these switches and a change in the state into electric signals and outputs the electric signals to the control unit 101. In addition, the operation unit 107 includes a plurality of light emitting diodes (LEDs) for informing the state of connection to a video receiving terminal and the state of communication with the video receiving terminal.

The video data supply device 110 supplies video data from, for example, a video camera or a DVD player and is connected to the video signal processing unit 106 through a video interface, such as an HDMI or a digital visual interface (DVI). In the example shown in FIG. 1, the video data supply device 110 and the video transmitting device 100 are separate devices and are connected to each other through the video interface. However, as described above, the present invention is not limited to this structure. For example, the video data supply device 110 may be provided in the video transmitting device 100 and the video data supply device 110 and the video signal processing unit 106 may be connected to each other.

In this embodiment, for example, the communication unit (for example, the wireless communication circuit unit 104 shown in FIG. 1), the image change unit (for example, the video signal processing unit 106 shown in FIG. 1), the storage unit (for example, the ROM 102 shown in FIG. 1), and the control unit (for example, the control unit 101 shown in FIG. 1) are essential components.

Next, the structure of the video receiving device will be described. FIG. 2 is a block diagram illustrating the structure of the video receiving device according to this embodiment. In the example shown in FIG. 2, a video receiving device 200 includes a control unit 201, a ROM 202, a RAM 203, a wireless communication circuit unit 204, an antenna 205, a video signal processing unit 206, and an operation unit 207. As shown in FIG. 2, all units of the video receiving device 200 are connected to each other.

In the example shown in FIG. 2, the video receiving device 200 is connected to the monitoring unit 210 which displays video data. In the example shown in FIG. 2, the monitoring unit 210 is different from the video receiving device 200. However, the present invention is not limited thereto. For example, the video receiving device 200 may include the monitoring unit 210.

The control unit 201 operates according to a program stored in the ROM 202 and controls each unit of the video receiving device 200. The ROM 202 is a rewritable non-volatile memory, such as a flash ROM, and stores various kinds of setting information, such as a program for operating the control unit 201 and communication setting parameters. The RAM 203 is a primary storage memory and is used as a work area which is used for the calculation operation of the control unit 201 or an area which temporarily stores various settings.

The wireless communication circuit unit 204 wirelessly communicates with other devices through the antenna 205. Specifically, the wireless communication circuit unit 204 includes, for example, a radio-frequency circuit unit required for wireless communication and a buffer memory which stores buffer data during wireless communication with an encoding/decoding circuit unit. The antenna 205 is connected to the wireless communication circuit unit 204. In this embodiment, the wireless communication circuit unit 204 performs wireless communication using a predetermined radio system, such as IEEE802.11.

The video signal processing unit 206 decompresses the compressed video data received by the wireless communication circuit unit 204, converts the video data into, for example, an HDMI or National Television System Committee (NTSC) video signal, and outputs the converted video signal to the monitoring unit 210. The operation unit 207 includes a plurality of switches, such as a power switch, an operation switch, and a setting switch, converts the state of these switches and a change in the state into electric signals, and outputs the electric signals to the control unit 201. In addition, the operation unit 207 includes a plurality of LEDs for informing the state of connection to the video transmitting device 100 and the state of communication with the video transmitting device 100. When the video transmitting devices 100, which are the connection destination of the video receiving device 200, are switched, the operation unit 207 operates as an input unit which designates the video transmitting device 100 to be selected as the connection destination from a list of the video transmitting devices 100 displayed on the monitoring unit 210.

The monitoring unit 210 is a display device, such as a liquid crystal display. The monitoring unit 210 includes a liquid crystal display device and a control circuit for the liquid crystal display device. In addition, the monitoring unit 210 includes a display unit which displays the video data transmitted from the video transmitting device 100 and informs a wireless connection state between the video receiving device 200 and the video transmitting device 100. The monitoring unit 210 further includes an EDID storage unit. An EDID storage unit 211 is a memory which stores EDID indicating the capability/specifications of the monitoring unit 210.

Next, the connected device list stored in the ROM 102 of the video transmitting device 100 will be described. FIG. 3 is a schematic diagram illustrating the data structure of the connected device list stored in the ROM 102 of the video transmitting device 100 according to this embodiment. The connected device list includes data items, such as a "media access control (MAC) address", a "device name", and "EDID" and stores data in each data item so as to be associated with each other in each row.

The data item "MAC address" stores a MAC address which is information for uniquely specifying the video receiving device 200 (wireless communication circuit unit 204). The data item "device name" stores the device name of the video receiving device 200 uniquely specified by the MAC address which is stored in the data item "MAC address" in the same row. The data item "EDID" stores the EDID of the monitoring unit 210 connected to the video receiving device 200 uniquely specified by the MAC address which is stored in the data item "MAC address" in the same row.

In the example shown in FIG. 3, in a row 101, a value which is stored in the data item "MAC address" is "MAC_01R", a value which is stored in the data item "device name" is "video receiving device 1", and a value which is stored in the data item "EDID" is "EDID_01". This indicates that the device name of the video receiving device 200 which is uniquely specified by the MAC address "MAC_01R" is "video receiving device 1" and the EDID of the monitoring unit 210 connected to the video receiving device 200 which is uniquely specified by the MAC address "MAC_01R" is "EDID_01". Data in other rows is as shown in FIG. 3.

Figure 4:
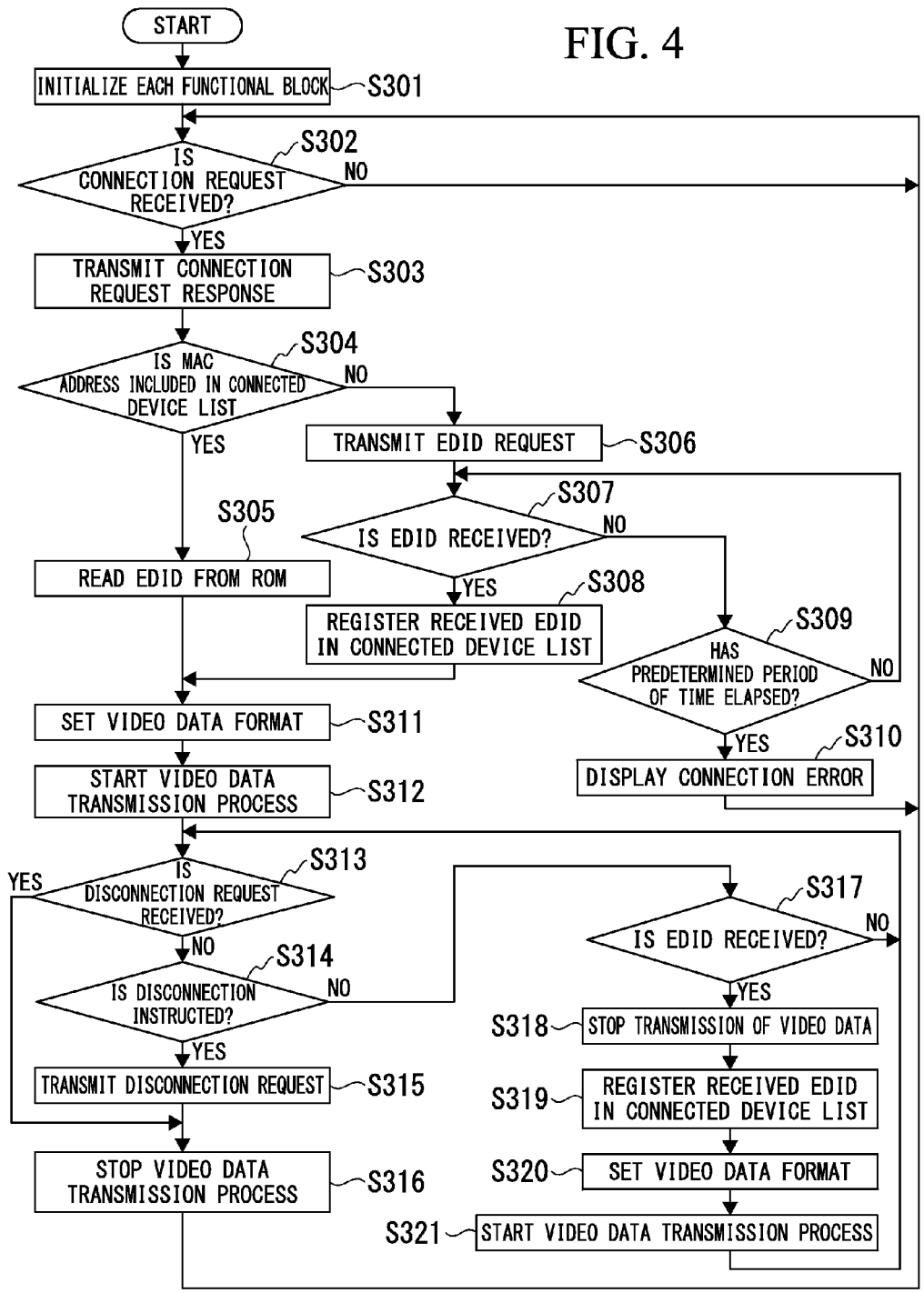
FIG. 4 is a flowchart illustrating the operation procedure of the video transmitting device according to the first embodiment of the present invention.

Next, the operation of the video transmitting device 100 will be described. FIG. 4 is a flowchart illustrating the operation procedure of the video transmitting device 100 according to this embodiment.

(Step S301) When the video transmitting device 100 is turned on, the control unit 101 initializes each unit of the video transmitting device 100. Then, the process proceeds to Step S302.

(Step S302) The video transmitting device 100 waits for a process until the wireless communication circuit unit 104 receives a connection request message transmitted from the video receiving device 200. When the wireless communication circuit unit 104 receives the connection request message transmitted from the video receiving device 200, the process proceeds to Step S303. Specifically, when the connection request message is transmitted from the video receiving device 200, the wireless communication circuit unit 104 receives the connection request message.

The control unit 101 determines whether the wireless communication circuit unit 104 has received the connection request message transmitted from the video receiving device 200. When the control unit 101 determines that the wireless communication circuit unit 104 has received the connection request message, the process proceeds to Step S303. In the other cases, Step S302 is performed again. The connection request message includes the MAC address and device name of the video receiving device 200 which has transmitted the connection request message. The control unit 101 of the video transmitting device 100 acquires, from the connection request message, the MAC address and device name of the video receiving device 200 which has transmitted the connection request message.

(Step S303) The control unit 101 transmits the connection request response message to the video receiving device 200 through the wireless communication circuit unit 104. Then, the process proceeds to Step S304. When Steps S302 and S303 are performed, the video transmitting device 100 establishes wireless communication connection with the video receiving device 200.

(Step S304) The control unit 101 determines whether the MAC address which is of the video receiving device 200 that has transmitted the connection request message and is acquired in Step S302 is included in the connected device list stored in the ROM 102. When the control unit 101 determines that the MAC address of the video receiving device 200 which has transmitted the connection request message is included in the connected device list, the process proceeds to Step S305. In the other cases, the process proceeds to Step S306.

(Step S305) The control unit 101 reads the EDID that is stored so as to be associated with the MAC address of the video receiving device 200 which has transmitted the connection request message from the connected device list stored in the ROM 102. Then, the process proceeds to Step S311.

(Step S306) The control unit 101 transmits an EDID request message to the video receiving device 200 through the wireless communication circuit unit 104. Then, the process proceeds to Step S307.

(Step S307) When the EDID of the monitoring unit 210 connected to the video receiving device 200 is transmitted from the video receiving device 200, the wireless communication circuit unit 104 receives the EDID. The control unit 101 determines whether the wireless communication circuit unit 104 has received the EDID transmitted from the video receiving device 200. When the control unit 101 determines that the EDID of the monitoring unit 210 connected to the video receiving device 200 has been received, the process proceeds to Step S308. In the other cases, the process proceeds to Step S309.

(Step S308) The control unit 101 stores the MAC address and device name of the video receiving device 200 that has transmitted the connection request message, which are acquired in Step S302, and the EDID of the monitoring unit 210 connected to the video receiving device 200 that has transmitted the connection request message, which are acquired in Step S307, in the connected device list stored in the ROM 102 so as to be associated with each other. Then, the process proceeds to Step S311.

(Step S309) The control unit 101 determines whether a predetermined period of time has elapsed after the transmission of the EDID request message in Step S306. When the control unit 101 determines that the predetermined period of time has elapsed after the transmission of the EDID request message in Step S306, the process proceeds to Step S310. In the other cases, the process proceeds to Step S307. The predetermined period of time may be predetermined or arbitrarily set.

(Step S310) The control unit 101 displays a connection error. Then, the process returns to Step S302.

(Step S311) The control unit 101 determines the format of the video data to be transmitted as a format which can be displayed by the monitoring unit 210, on the basis of the EDID of the monitoring unit 210 connected to the video receiving device 200 that has transmitted the connection request message, which is acquired in Step S305 or Step S307. Then, the process proceeds to Step S312. For example, the format of video data before the change is 1920×1080 (60 Hz) and the format of video data after the change is 1280×720 (60 Hz).

(Step S312) The video transmitting device 100 starts a process of transmitting the video data which has changed to the format determined in Step S311 to the video receiving device 200 which has transmitted the connection request message. Then, the process proceeds to Step S313. Specifically, the video signal processing unit 106 acquires video data from the video data supply device 110 and changes the format of the acquired video data to the format determined in Step S311. In addition, the video signal processing unit 106 compresses the video data with the changed format using a predetermined method and outputs the compressed video data to the wireless communication circuit unit 104. The wireless communication circuit unit 104 transmits the video data input from the video signal processing unit 106 to the video receiving device 200 which has transmitted the connection request message.

(Step S313) When a disconnection request message is transmitted from the video receiving device 200, the wireless communication circuit unit 104 receives the disconnection request message. The control unit 101 determines whether the wireless communication circuit unit 104 has received the disconnection request message from the video receiving device 200. When the control unit 101 determines that the wireless communication circuit unit 104 has received the disconnection request message, the process proceeds to Step S316. In the other cases, the process proceeds to Step S314.

(Step S314) When stopping the transmission of the video data, the user of the video transmitting device 100 operates the operation unit 107 to input a disconnection instruction. The control unit 101 determines whether the operation unit 107 has received the input disconnection instruction. When the control unit 101 determines the operation unit 107 has received the input disconnection instruction, the process proceeds to Step S315. In the other cases, the process proceeds to Step S317.

(Step S315) The control unit 101 transmits the disconnection request message to the video receiving device 200 through the wireless communication circuit unit 104. Then, the process proceeds to Step S316.

(Step S316) The control unit 101 stops the operations of the video signal processing unit 106 and the wireless communication circuit unit 104 and ends the video data transmission process. Then, the process returns to Step S302.

(Step S317) When the EDID is transmitted from the video receiving device 200, the wireless communication circuit unit 104 receives the EDID. The control unit 101 determines whether the wireless communication circuit unit 104 has received the EDID from the video receiving device 200. When the control unit 101 determines that the wireless communication circuit unit 104 has received the EDID, the process proceeds to Step S318. In the other cases, the process returns to Step S313.

(Step S318) The control unit 101 stops the operations of the video signal processing unit 106 and the wireless communication circuit unit 104 and ends the video data transmission process. Then, the process proceeds to Step S319.

(Step S319) The control unit 101 deletes the stored MAC address of the video receiving device 200 that has transmitted the connection request message, which is acquired in Step S302, and the device name and the EDID that are stored so as to be associated with the MAC address from the connected device list stored in the ROM 102. Then, the control unit 101 stores the MAC address and device name of the video receiving device 200 that has transmitted the connection request message, which are acquired in Step S302, and the EDID of the monitoring unit 210 connected to the video receiving device 200 that has transmitted the connection request message, which is acquired in Step S317, in the connected device list stored in the ROM 102 so as to be associated with each other. Then, the process proceeds to Step S320. In addition, instead of the structure in which the MAC address, the device name, and the EDID are deleted and a new MAC address, a new device name, and a new EDID are stored, the EDID acquired in Step S317 may be overwritten.

(Step S320) The control unit 101 determines the format of the video data to be transmitted as the format which can be displayed by the monitoring unit 210, on the basis of the EDID of the monitoring unit 210 connected to the video receiving device 200 that has transmitted the connection request message, which is acquired in Step S317. Then, the process proceeds to Step S321.

(Step S321) The video transmitting device 100 starts a process of transmitting the video data which has been changed to the format determined in Step S320 to the video receiving device 200 which has transmitted the connection request message. Then, the process returns to Step S313.

A communication step described in the claims corresponds to, for example, Steps S302, S303, and S321. An image change step described in the claims corresponds to, for example, Steps S311 and S320. A storage step described in the claims corresponds to, for example, Steps S306 to S308, Step S317, and Step S319. A control step described in the claims corresponds to, for example, Steps S304, S305, and S312. In the present invention, for example, Steps S302 to S308, Step S311, Step S312, Step S317, and Steps S319 to S321 shown in FIG. 4 are essential components.

Figure 5:
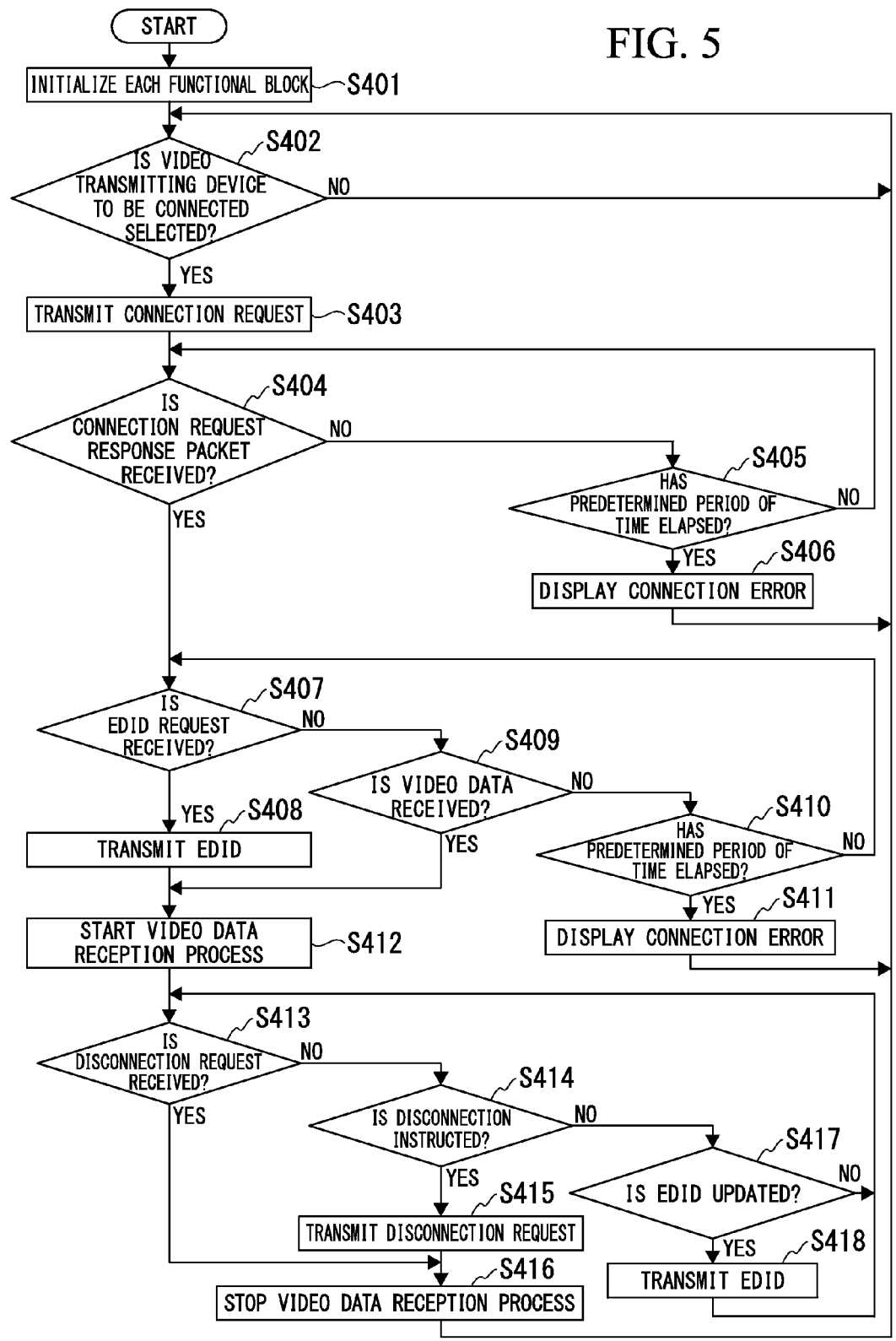
FIG. 5 is a flowchart illustrating the operation procedure of the video receiving device according to the first embodiment of the present invention.

Next, the operation of the video receiving device 200 will be described. FIG. 5 is a flowchart illustrating the operation procedure of the video receiving device 200 according to this embodiment.

(Step S401) When the video receiving device 200 is turned on, the control unit 101 initializes each unit of the video receiving device 200. Then, the process proceeds to Step S402.

(Step S402) When selecting the video transmitting device 100 to be connected to the video receiving device 200, the user of the video receiving device 200 operates the operation unit 207 to input an instruction to select the video transmitting device 100 to be connected. The control unit 201 determines whether the operation unit 207 has received the input selection instruction. When the control unit 201 determines that the operation unit 207 has received the input selection instruction, the process proceeds to Step S403. In the other cases, Step S402 is performed again.

(Step S403) The control unit 201 transmits a connection request message to the video transmitting device 100 selected by the user through the wireless communication circuit unit 204 on the basis of the selection instruction input by the operation unit 207 in Step S403. Then, the process proceeds to Step S404.

(Step S404) When a connection request response message is transmitted from the video transmitting device 100, the wireless communication circuit unit 204 receives the connection request response message. The control unit 201 determines whether the wireless communication circuit unit 204 has received the connection request response message transmitted from the video transmitting device 100. When the control unit 201 determines that the wireless communication circuit unit 204 has received the connection request response message, the process proceeds to Step S407. In the other cases, the process proceeds to Step S405.

(Step S405) The control unit 201 determines whether a predetermined period of time has elapsed after the transmission of the connection request message in Step S403. When the control unit 201 determines that the predetermined period of time has elapsed after the transmission of the connection request message in Step S403, the process proceeds to Step S406. In the other cases, the process returns to Step S404. The predetermined period of time may be predetermined or arbitrarily set.

(Step S406) The control unit 201 displays a connection error. Then, the process returns to Step S402.

(Step S407) When an EDID request message is transmitted from the video transmitting device 100, the wireless communication circuit unit 204 receives the EDID request message. The control unit 201 determines whether the wireless communication circuit unit 204 has received the EDID request message transmitted from the video transmitting device 100. When the control unit 201 determines that the wireless communication circuit unit 204 has received the EDID request message, the process proceeds to Step S408. In the other cases, the process proceeds to Step S409.

(Step S408) The control unit 201 reads the EDID of the monitoring unit 210 from the EDID storage unit 211 of the monitoring unit 210. Then, the control unit 201 transmits the EDID of the monitoring unit 210 to the video transmitting device 100 through the wireless communication circuit unit 204. Then, the process proceeds to Step S412.

(Step S409) When video data is transmitted from the video transmitting device 100, the wireless communication circuit unit 204 receives the video data. The control unit 201 determines whether the wireless communication circuit unit 204 has received the video data transmitted from the video transmitting device 100. When the control unit 201 determines that the wireless communication circuit unit 204 has received the video data, the process proceeds to Step S412. In the other cases, the process proceeds to Step S410.

(Step S410) The control unit 201 determines whether a predetermined period of time has elapsed after the connection request response message has been determined to be received in Step S404. When the control unit 201 determines that the predetermined period of time has elapsed after the reception of the connection request response message in Step S404, the process proceeds to Step S411. In the other cases, the process returns to Step S407. The predetermined period of time may be predetermined or arbitrarily set.

(Step S411) The control unit 201 displays a connection error. Then, the process returns to Step S402.

(Step S412) The video receiving device 200 starts a process of receiving the video data transmitted from the video transmitting device 100. Then, the process proceeds to Step S413. Specifically, the wireless communication circuit unit 204 receives the video data transmitted from the video transmitting device 100. The video signal processing unit 206 decompresses the video data which has been received by the wireless communication circuit unit 204 and then compressed, converts the video data into, for example, an HDMI or NTSC video signal, and outputs the video signal to the monitoring unit 210. The monitoring unit 210 displays an image based on the video signal input from the video signal processing unit 206.

(Step S413) When a disconnection request message is transmitted from the video transmitting device 100, the wireless communication circuit unit 204 receives the disconnection request message. The control unit 201 determines whether the wireless communication circuit unit 204 has received the disconnection request message transmitted from the video transmitting device 100. When the control unit 201 determines that the wireless communication circuit unit 204 has received the disconnection request message, the process proceeds to Step S416. In the other cases, the process proceeds to Step S414.

(Step S414) When stopping the reception of the video data, the user of the video receiving device 200 operates the operation unit 207 to input a disconnection instruction. The control unit 201 determines whether the operation unit 207 has received the input disconnection instruction. When the control unit 201 determines that the operation unit 207 has received the input disconnection instruction, the process proceeds to Step S415. In the other cases, the process proceeds to Step S417.

(Step S415) The control unit 201 transmits the disconnection request message to the video transmitting device 100 through the wireless communication circuit unit 204. Then, the process proceeds to Step S416.

(Step S416) The control unit 201 stops the operations of the wireless communication circuit unit 204 and the video signal processing unit 206 and ends the video data reception process. Then, the process returns to Step S402.

(Step S417) When the settings of the monitoring unit 210 connected to the video receiving device 200 are changed or when the connected monitoring unit 210 is replaced, the capability/specifications of the monitoring unit 210 are changed and the EDID stored in the EDID storage unit 211 of the monitoring unit 210 is also changed. The control unit 201 reads the EDID stored in the EDID storage unit 211 and determines whether the read EDID is different from the EDID read in Step S408. That is, the control unit 201 determines whether the EDID has been changed. When the control unit 201 determines that the read EDID is different from the EDID read in Step S408, the process proceeds to Step S418. In the other cases, the process returns to Step S413.

When the above-mentioned process is performed, the video transmitting device 100 can transmit an EDID request to the video receiving device 200 which has established communication connection first and acquire the EDID of the monitoring unit 210 connected to the video receiving device 200. Then, the video transmitting device 100 can store the MAC address and device name of the video receiving device 200 and the EDID of the monitoring unit 210 connected to the video receiving device 200 in the connected device list so as to be associated with each other.

When communication connection with the video receiving device 200 is reestablished, the video transmitting device 100 acquires the EDID from the connected device list, without transmitting an EDID request message, since the EDID of the monitoring unit 210 connected to the video receiving device 200 is stored in the connected device list. Then, the video transmitting device 100 determines the format of the video data to be transmitted as the format which can be displayed by the monitoring unit 210, on the basis of the EDID acquired from the connected device list. In addition, the video transmitting device 100 starts a process of transmitting the video data which has been changed to the format determined on the basis of the EDID to the video receiving device 200. Therefore, it is possible to omit an EDID request process and to reduce the time until the EDID is acquired. As a result, it is possible to reduce a connection switching time until the transmission of the video data starts.

When the settings of the monitoring unit 210 connected to the video receiving device 200 are changed or when the connected monitoring unit 210 is replaced, the capability/specifications of the monitoring unit 210 are changed and the EDID is also changed. When the EDID stored in the EDID storage unit 211 of the monitoring unit 210 is changed, the video receiving device 200 transmits the changed EDID to the video transmitting device 100. Therefore, even when the settings of the monitoring unit 210 connected to the video receiving device 200 are changed or even when the connected monitoring unit 210 is replaced, the video transmitting device 100 can change the format of the video data to the format which can be reproduced by the changed monitoring unit 210 and transmit the video data.

Second Embodiment

Next, a second embodiment of the present invention will be described with reference to the drawings. A video transmitting device 100 according to this embodiment has the same structure as the video transmitting device 100 according to the first embodiment. A video receiving device 200 according to this embodiment has the same structure as the video receiving device 200 according to the first embodiment.

When the settings of a monitoring unit 210 connected to the video receiving device 200 are changed or the connected monitoring unit 210 is changed until the communication connection established between the video transmitting device 100 and the video receiving device 200 is cut and is then reestablished, the EDID in the connected device list stored in a ROM 102 of the video transmitting device 100 is likely to be different from the EDID of the monitoring unit 210 connected to the video receiving device 200. Therefore, when the communication connection between the video transmitting device 100 and the video receiving device 200 is reestablished, the video transmitting device 100 is likely to transmit video data which cannot be displayed by the monitoring unit 210 to the video receiving device 200.

Figure 6:
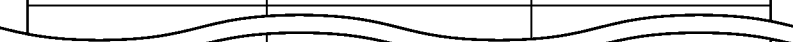
FIG. 6 is a schematic diagram illustrating the data structure of an EDID change list in a second embodiment of the present invention.

In this embodiment, in order to prevent the inconsistence between the EDIDs, the ROM 202 of the video receiving device 200 stores an EDID change list. FIG. 6 is a schematic diagram illustrating the data structure of the EDID change list stored in the ROM 202 of the video receiving device 200 according to this embodiment. The EDID change list includes data items "MAC address", "device name", and "EDID update flag" and data in each data item is stored so as to be associated with each other in each row. A MAC address and an EDID change flag are stored for each video transmitting device 100 which establishes wireless connection with the video receiving device 200.

The data item "MAC address" stores a MAC address which is information for uniquely specifying the video transmitting device 100 (wireless communication circuit unit 104). The data item "device name" stores the device name of the video transmitting device 100 which is uniquely specified by the MAC address stored in the data item "MAC address" in the same row. The data item "EDID update flag" stores a change flag indicating whether the EDID of the monitoring unit 210 connected to the video receiving device 200 is changed after wireless connection with the video transmitting device 100 which is uniquely specified by the MAC address stored in the data item "MAC address" in the same row is cut.

An EDID change flag "0" indicates that the EDID of the monitoring unit 210 connected to the video receiving device 200 is not changed after wireless connection with the video transmitting device 100 which is uniquely specified by the MAC address stored in the data item "MAC address" in the same row is cut. An EDID change flag "1" indicates that the EDID of the monitoring unit 210 connected to the video receiving device 200 is changed after wireless connection with the video transmitting device 100 which is uniquely specified by the MAC address stored in the data item "MAC address" in the same row is cut.

In this embodiment, when the EDID of the monitoring unit 210 connected to the video receiving device 200 is changed after wireless connection with the video transmitting device 100 is cut, a control unit 201 stores the device name of the video transmitting device 100, the MAC address which uniquely specifies the video transmitting device 100, and the EDID change flag "1" in the EDID change list stored in the ROM 202 so as to be associated with each other. In addition, the control unit 201 reestablished the wireless connection between the video receiving device 200 and the video transmitting device 100 uniquely specified by the MAC address which is stored in the EDID change list stored in the ROM 202 so as to be associated with the EDID change flag "1". When transmitting the EDID to the video transmitting device 100, the control unit 201 changes the EDID change flag to "0". Therefore, it is possible to determine whether the EDID of the monitoring unit 210 connected to the video receiving device 200 has been changed, with reference to the EDID change flag, until the communication connection established between the video receiving device 200 and the video transmitting device 100 is cut and is then reestablished.

In the example shown in FIG. 6, in a row 201, a value which is stored in the data item "MAC address" is "MAC_01T", a value which is stored in the data item "device name" is "video receiving device 1", and a value which is stored in the data item "EDID change flag" is "1". This indicates that the device name of the video transmitting device 100 which is uniquely specified by the MAC address "MAC_01T" is "video receiving device 1" and the EDID of the monitoring unit 210 connected to the video receiving device 200 after wireless communication with the video transmitting device 100 uniquely specified by the MAC address "MAC_01T" is cut is changed. Data in other rows is as shown in FIG. 6.

Figure 7:
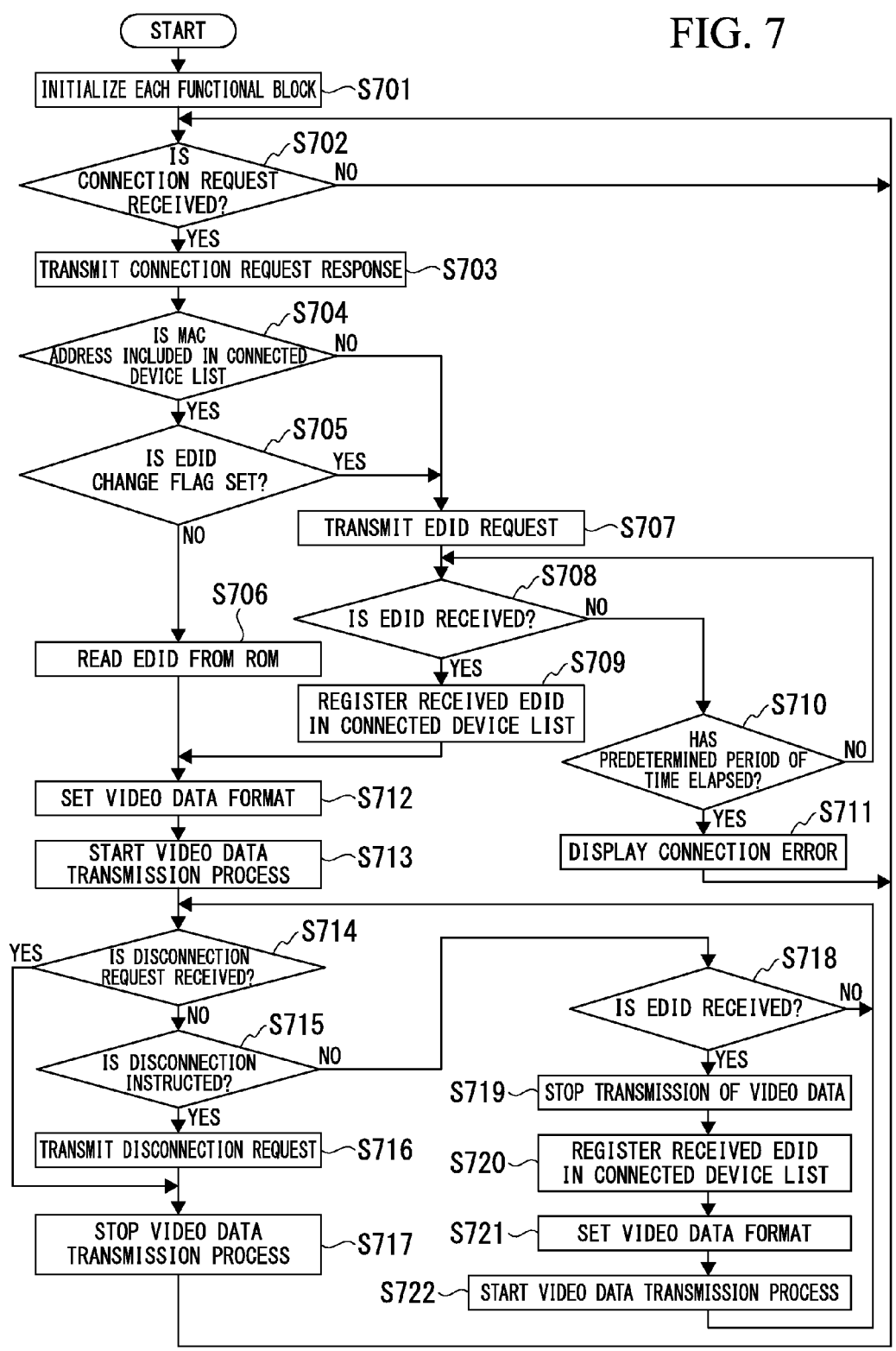
FIG. 7 is a flowchart illustrating the operation procedure of a video transmitting device according to the second embodiment of the present invention.

Next, the operation of the video transmitting device 100 will be described. FIG. 7 is a flowchart illustrating the operation procedure of the video transmitting device 100 according to this embodiment.

(Step S701) When the video transmitting device 100 is turned on, a control unit 101 initializes each unit of the video transmitting device 100. Then, the process proceeds to Step S702.

(Step S702) The video transmitting device 100 waits for a process until a wireless communication circuit unit 104 receives a connection request message transmitted from the video receiving device 200. When the wireless communication circuit unit 104 receives the connection request message transmitted from the video receiving device 200, the process proceeds to Step S703. Specifically, when the connection request message is transmitted from the video receiving device 200, the wireless communication circuit unit 104 receives the connection request message. The control unit 101 determines whether the wireless communication circuit unit 104 has received the connection request message transmitted from the video receiving device 200. Then, when the control unit 101 determines that the wireless communication circuit unit 104 has received the connection request message, the process proceeds to Step S703. In the other cases, Step S702 is performed again. The connection request message includes the MAC address of the video receiving device 200 which has transmitted the connection request message, the device name, and the EDID update flag. The control unit 101 of the video transmitting device 100 acquires the MAC address of the video receiving device 200 which has transmitted the connection request message, the device name, and the EDID update flag from the connection request message.

(Step S703) The control unit 101 transmits a connection request response message to the video receiving device 200 through the wireless communication circuit unit 104. Then, the process proceeds to Step S704.

(Step S704) The control unit 101 determines whether the MAC address of the video receiving device 200 that has transmitted the connection request message, which is acquired in Step S702, is included in the connected device list stored in the ROM 102. When the control unit 101 determines that the MAC address of the video receiving device 200 that has transmitted the connection request message is included in the connected device list, the process proceeds to Step S705. In the other cases, the process proceeds to Step S707.

(Step S705) The control unit 101 determines whether the EDID update flag acquired in Step S702 is "1" (set). When the control unit 101 determines that the EDID update flag is "1", the process proceeds to Step S707. In the other cases, the process proceeds to Step S706.

The process in Steps S706 to S722 is the same as that in Steps S305 to S321 in the first embodiment.

A communication step described in the claims corresponds to, for example, Steps S702, S703, and S722. An image change step described in the claims corresponds to, for example, Steps S712 and S721. A storage step described in the claims corresponds to, for example, Steps S707 to S709 and Steps S718 and S720. A control step described in the claims corresponds to, for example, Steps S704 to S706 and Step S713. In the present invention, for example, Steps S702 to S709, Step S712, Step S713, Step S718, and Steps S720 to S722 in FIG. 7 are essential components.

Figure 8:
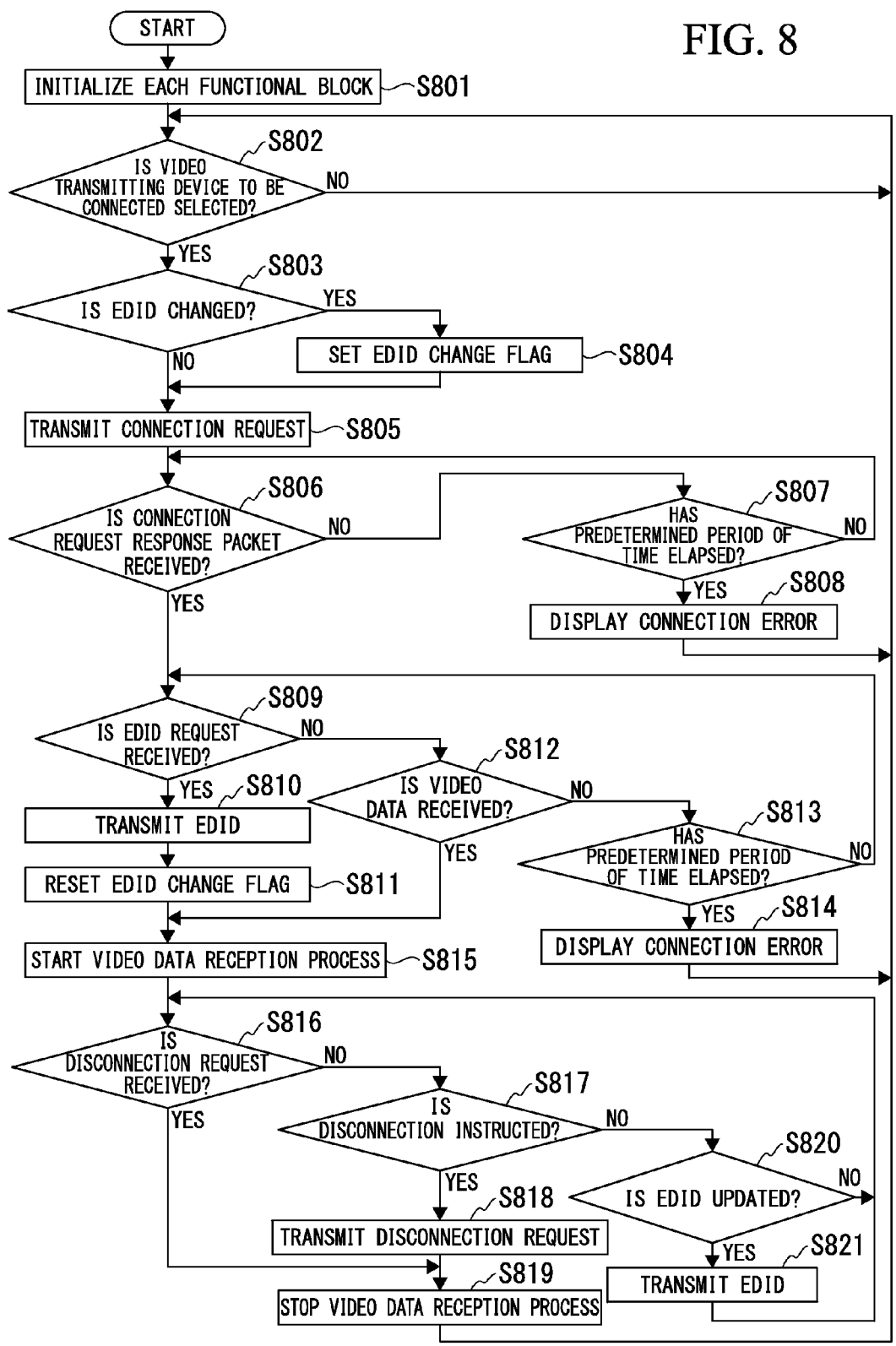
FIG. 8 is a flowchart illustrating the operation procedure of a video receiving device according to the second embodiment of the present invention.

Next, the operation of the video receiving device 200 will be described. FIG. 8 is a flowchart illustrating the operation procedure of the video receiving device 200 according to this embodiment.

(Step S801) When the video receiving device 200 is turned on, the control unit 101 initializes each unit of the video receiving device 200. Then, the process proceeds to Step S802.

(Step S802) When selecting the video transmitting device 100 to be connected to the video receiving device 200, the user of the video receiving device 200 operates an operation unit 207 to input an instruction to select the video transmitting device 100 to be connected. The control unit 201 determines whether the operation unit 207 has received the input selection instruction. When the control unit 201 determines that the operation unit 207 has received the input selection instruction, the process proceeds to Step S803. In the other cases, Step S802 is performed again.

(Step S803) The control unit 201 determines whether the EDID of the monitoring unit 210 connected to the video receiving device 200 is changed after wireless connection with the video transmitting device 100 selected in Step S802 is cut. When the control unit 201 determines that the EDID of the monitoring unit 210 connected to the video receiving device 200 is changed after wireless connection with the video transmitting device 100 selected in Step S802 is cut, the process proceeds to Step S804. In the other cases, the process proceeds to Step S805. In addition, when the video receiving device 200 is first connected to the video transmitting device 100 selected in Step S802, the process proceeds to Step S804.

(Step S804) The control unit 201 stores the MAC address and device name of the video transmitting device 100 selected in Step S802 in the EDID change list stored in the ROM 202 so as to be associated with the EDID change flag "1". When the MAC address and device name of the video transmitting device 100 selected in Step S802 have been stored in the EDID change list stored in the ROM 202, the control unit 201 changes the EDID update flag associated with the MAC address to "1". Then, the process proceeds to Step S805.

The process in Steps S805 to S808 is the same as that in Steps S403 to S406 in the first embodiment.

(Step S809) When an EDID request message is transmitted from the video transmitting device 100, the wireless communication circuit unit 204 receives the EDID request message. The control unit 201 determines whether the wireless communication circuit unit 204 has received the EDID request message transmitted from the video transmitting device 100. When the control unit 201 determines that the wireless communication circuit unit 204 has received the EDID request message, the process proceeds to Step S810. In the other cases, the process proceeds to Step S812.

(Step S810) The control unit 201 reads the EDID of the monitoring unit 210 from the EDID storage unit 211 of the monitoring unit 210. Then, the control unit 201 transmits the EDID of the monitoring unit 210 to the video transmitting device 100 through the wireless communication circuit unit 204. Then, the process proceeds to Step S811.

(Step S811) The control unit 201 changes the EDID update flag (recorded in the EDID change list stored in the ROM 202) which is associated with the MAC address and device name of the video transmitting device 100 selected in Step S802 to "0". Then, the process proceeds to Step S815.

The process in Steps S812 to S821 is the same as that in Steps S409 to S418 in the first embodiment.

As described above, according to this embodiment, when the EDID of the monitoring unit 210 connected to the video receiving device 200 is changed after wireless connection with the video transmitting device 100 is cut, the control unit 201 of the video receiving device 200 stores in association with the device name, MAC address which uniquely specify the video transmitting device 100, and the EDID change flag "1" in the EDID change list stored in the ROM 202 so as to be associated with each other. When wireless connection is reestablished between the video receiving device 200 and the video transmitting device 100 uniquely specified by the MAC address which is stored in the EDID change list stored in the ROM 202 so as to be associated with the EDID change flag "1" and the EDID is transmitted to the video transmitting device 100, the control unit 201 changes the EDID change flag to "0". Therefore, it is possible to determine whether the EDID of the monitoring unit 210 connected to the video receiving device 200 is changed, with reference to the EDID change flag, until the communication connection established between the video receiving device 200 and the video transmitting device 100 is cut and reestablished.

The video transmitting device 100 receives the EDID change flag from the video receiving device 200 and determines whether the EDID update flag is "1", that is, whether the EDID of the monitoring unit 210 connected to the video receiving device 200 is changed until the communication connection established between the video receiving device 200 and the video transmitting device 100 is cut and reestablished. When it is determined that the EDID of the monitoring unit 210 connected to the video receiving device 200 is changed until the established communication connection is cut and the communication connection is reestablished, the video transmitting device 100 acquires the EDID from the video receiving device 200 again. Therefore, even when the EDID of the monitoring unit 210 connected to the video receiving device 200 is changed until the established communication connection is cut and the communication connection is reestablished, the video transmitting device 100 can transmit video data in a format which can be reproduced by the monitoring unit 210 connected to the video receiving device 200.

The first and second embodiments of the present invention have been described above in detail with reference to the drawings. However, the detailed structures are not limited to these embodiments, but the present invention also includes any design which is within the scope and spirit of the present invention.

For example, in the above-described embodiments, the video receiving device 200 transmits the connection request message to the video transmitting device 100 and the video transmitting device 100 transmits the connection request response message, which is a response to the connection request message, to the video receiving device 200 to establish the wireless communication connection between the video transmitting device 100 and the video receiving device 200. However, the present invention is not limited thereto. For example, the video transmitting device 100 may transmit the connection request message to the video receiving device 200 and the video receiving device 200 may transmit the connection request response message, which is a response to the connection request message, to the video transmitting device 100 to establish the wireless communication connection between the video transmitting device 100 and the video receiving device 200.

Some or all of the functions of each unit of the video transmitting device 100 and some or all of the functions of each unit of the video receiving device 200 may be implemented by recording a program for implementing these functions on a computer-readable recording medium and allowing a computer system to read the program recorded on the recording medium. The term "computer system" includes an OS and hardware, such as peripheral devices.

The "computer-readable recording medium" means a portable medium, such as a flexible disk, a magneto-optical disk, a ROM, or a CD-ROM, or a storage unit, such as a hard disk provided in a computer system. The "computer-readable recording medium" may include a medium that dynamically stores a program for a short period of time, such as a communication line used when a program is transmitted through a network such as the Internet or a communication line such as a telephone line, or a medium that stores a program for a predetermined period of time, such as a volatile memory provided in a computer system serving as a server or a client. Furthermore, the program may be executed to implement some of the above-mentioned functions. Further, the above-mentioned functions may be implemented by combinations of all programs recorded on the computer system.

The invention claimed is:

1. An image transmission device which transmits to a display device including a display unit which displays an image in time series, the image transmission device comprising:
   a communication unit of the image transmission device which wirelessly transmits a first image to the display device in time series for a period from a time when wireless communication connection with the display device is established to a time when the wireless communication connection is cut;
   an image change unit which changes a first format of the first image to be wirelessly transmitted to the display device based on setting information of the display unit of the display device which establishes the wireless communication connection;
   a storage unit that stores in association with a display device identifier for uniquely identifying the display device and the setting information of the display unit of the display device; and
   a control unit which causes the first format of the first image to change to a second format by the image change unit based on the setting information stored in the storage unit and causes a second image which is changed to the second format to be wirelessly transmitted to a communication unit connected to the display device, without generating request for transmission of the setting information for wirelessly transmitting to the display device, when the wireless communication connection with the display device is established and the storage unit stores in association with the display device identifier for uniquely identifying the display device and the setting information, the control unit configured to generate the request for transmission of the setting information and the communication unit of the image transmission device configured to wirelessly transmit the request to the display device when the communication unit of the image transmission device receives flag information indicating that the setting information is changed from the display device.

2. The image transmission device according to claim 1, wherein the flag information is included in a connection request message transmitted from the display device or a connection request response message transmitted from the display device.

3. The image transmission device according to claim 1, wherein the control unit configured to generate the request for transmission of the setting information and communication unit of the image transmission device configured to wirelessly transmit the request to the display device when the association with the display device identifier for uniquely identifying the display device and the setting information are not stored in the storage unit.

4. The image transmission device according to claim 3, wherein the control unit configured to generate the request for transmission of the setting information and communication unit of the image transmission device configured to wirelessly transmit the request to the display device when the wireless communication connection with the display device is established and the association with the display device identifier for uniquely identifying the display device and the setting information is not stored in the storage unit.

5. An image transmission method comprising:
a communication step of allowing a communication unit of an image transmission device to wirelessly transmit a first image to a display device in time series for a period from a time when wireless communication connection with the display device including a display unit which displays the first image in time series is established to a time when the wireless communication connection is cut;
an image change step of allowing an image change unit to change a first format of the first image to be wirelessly transmitted to the display device based on setting information of the display unit of the display device which establishes the wireless communication connection;
a storage step of allowing a storage unit to store in association with a display device identifier for uniquely identifying the display device and the setting information of the display unit of the display device; and
a control step of allowing a control unit to cause the first format of the first image to change to a second format by the image change unit based on the setting information stored in the storage unit, to cause a second image which is changed to the second format to be wirelessly transmitted to a communication unit connected to the display device, without generating request for transmission of the setting information for wirelessly transmitting to the display device, when the wireless communication connection with the display device is established and the storage unit stores in association with the display device identifier for uniquely identifying the display device and the setting information, and to generate the request for transmission of the setting information and to wirelessly transmit the request by the communication unit of the image transmission device to the display device when the communication unit of the image transmission device receives flag information indicating that the setting information is changed from the display device.

6. A non-transitory computer-readable device storing an executable program that instructs a computer to perform the following steps:

a communication step of allowing a communication unit of an image transmission device to wirelessly transmit a first image to a display device in time series for a period from a time when wireless communication connection with the display device including a display unit which displays the first image in time series is established to a time when the wireless communication connection is cut;

an image change step of allowing an image change unit to change a first format of the first image to be wirelessly transmitted to the display device based on setting information of the display unit of the display device which establishes the wireless communication connection;

a storage step of allowing a storage unit to store in association with a display device identifier for uniquely identifying the display device and the setting information of the display unit of the display device; and a control step of allowing a control unit to cause the first format of the first image to change to a second format by the image change unit based on the setting information stored in the storage unit, to cause a second image which is changed to the second format to be wirelessly transmitted to a communication unit connected to the display device, without generating request for transmission of the setting information for wirelessly transmitting to the display device, when the wireless communication connection with the display device is established and the storage unit stores in association with the display device identifier for uniquely identifying the display device and the setting information, and to generate the request for transmission of the setting information and to wirelessly transmit the request by the communication unit of the image transmission device to the display device when the communication unit of the image transmission device receives flag information indicating that the setting information is changed from the display device.

* * * * *